United States Patent [19]

Bezzerides

[11] Patent Number: 4,782,654

[45] Date of Patent: Nov. 8, 1988

[54] APPARATUS FOR REMOVING MATERIAL FROM A WORK AREA

[76] Inventor: Paul A. Bezzerides, 41645 Road 142, Orosi, Calif. 93647

[21] Appl. No.: 147,700

[22] Filed: Jan. 25, 1988

[51] Int. Cl.$^4$ ............................................. A01D 78/00
[52] U.S. Cl. ........................................ 56/370; 56/400; 56/328.1
[58] Field of Search ............. 56/370, 192, 193, 328 R, 56/377, 400, 400.02, 400.03, DIG. 21

[56] References Cited

U.S. PATENT DOCUMENTS

| | | | |
|---|---|---|---|
| 2,710,519 | 6/1955 | Winter | 56/377 |
| 2,811,009 | 10/1957 | Plant | 56/377 |
| 2,860,478 | 11/1958 | Vanderlely | 56/377 |
| 3,150,721 | 9/1964 | Vanderlely | 172/544 |
| 3,349,551 | 10/1967 | Pickrell | 56/377 |
| 3,377,788 | 4/1968 | Pickrell | 56/377 |
| 3,706,191 | 12/1972 | Barbot | 56/377 |
| 3,995,416 | 12/1976 | Vanderlely | 56/370 |
| 4,505,096 | 3/1985 | Brown | 56/377 |
| 4,723,403 | 2/1988 | Webster | 56/377 |

*Primary Examiner*—John Weiss
*Attorney, Agent, or Firm*—Worrel & Worrel

[57] ABSTRACT

An apparatus for removing material from a work area during substantially continuous movement therealong, the apparatus having a frame; a wheel assembly mounted on the frame for rotation about a substantially upright axis of rotation; a plurality of material removing members mounted on the wheel assembly in outward extension therefrom; and an assembly for mounting the frame on a vehicle for movement along the work area with a portion of the wheel assembly in ground engagement whereby the wheel assembly is rotated to remove material from the work area with the removing members.

14 Claims, 5 Drawing Sheets

APPARATUS FOR REMOVING MATERIAL FROM A WORK AREA

BACKGROUND OF THE INVENTION

1. Field of the Invention:

The present invention relates to an apparatus for removing material from a work area and, more particularly, to such an apparatus adapted to remove weeds, prunings, trash and the like from along row crops and between adjoining plants within the row during substantially continuous movement therealong.

2. Description of the Prior Art:

The mechanization of agriculture in a continuing effort to minimize overhead expense while increasing production has produced a multitude of labor saving devices and farm practices. Many of these have successfully achieved their intended objectives without negative impact. Others either have not achieved their objectives or have aggravated or created other problems requiring solution.

The cultivating, harvesting and pruning of row crops have seen substantial mechanization for nearly all types of crops. However, the control afforded with manual labor is absent. The trash produced in such mechanized operations is, for the most part, simply scattered randomly throughout the area with the greatest accumulation being around the bases of the plants. The trash falling between the rows can easily be cleared or disked into the soil, but that falling adjacent to the plants and particularly that falling between adjoining plants within the row has been difficult or impossible to remove by mechanized means.

For example, such trash produced in the cultivating, harvesting and pruning of grapevines, fruit and nut trees and the like falls in greatest volume immediately adjacent to the plants and between adjoining plants in the row. It cannot economically be removed using manual labor. Such prior art mechanized devices as have existed have not effectively removed such trash and have, to varying degrees of severity, damaged the trunks of the grapevines and trees. Such damage is not only harmful to the plants in and of itself, but penetration of the outer epidermal layer of the trunks provides access for pests and hazardous substances to the interior of the plants.

With the increasing use of drip and sprinkler irrigation in farming operations, such prior art attempts at the mechanized removal of such trash have been rendered largely useless. The mechanical devices rip out water lines, tear down risers and otherwise damage such irrigation systems, trellis structures and the like to the point that they are entirely unsatisfactory for the purpose.

Similarly, public and governmental resistance to and prohibition of the use of herbicides has limited the extent to which weeds can be chemically controlled adjacent to row crops. Accordingly, weed control is again becoming a more troublesome problem in farming operations. As with trash removal, prior art mechanized removal of weeds in and adjacent to row crops has not proved satisfactory because of the damage caused to the plants, trellis structures, irrigation systems and the like. On the other hand, the manual removal of weeds within the rows is largely cost prohibitive.

Therefore, it has long been known that it would be desirable to have an apparatus for removing material from a work area which is particularly well suited to the removal of weeds, prunings, trash and the like from adjacent to row crops such as grapevines, fruit and nut trees and the like; which is fully capable of removing all such trash, both immediately adjacent to the row and between adjoining plants within the row; which is sufficiently sensitive in operation to avoid damage to the plants within the row as well as irrigation systems, trellis structures and the like; and which can be operated economically by both large and small scale farming operations.

SUMMARY OF THE INVENTION

Therefore, it is an object of the present invention to provide an improved apparatus for removing material from a work area.

Another object is to provide such an apparatus which is particularly well suited to the removal of material produced by the cultivating, harvesting and pruning of row crops.

Another object is to provide such an apparatus which is operable to remove trash and the like from along row crops and particularly immediately adjacent to the row crops and between adjoining plants within the row during substantially continuous movement along the row.

Another object is to provide such an apparatus which is operable to distinguish between trash and the like to be removed and objects within the row to be preserved, such as the plants themselves, trellis structures, irrigation systems, and the like, removing the former while leaving the latter undamaged.

Another object is to provide such an apparatus which can contact the trunks of grapevines, trees or the like within the row without penetrating the outer epidermal layers of the trunks.

Another object is to provide such an apparatus which can be operated to remove weeds growing in and around plants within the row so dependably as to be able to avoid the use of herbicides entirely.

Another object is to provide such an apparatus which can be operated to remove material from in and around two adjoining rows during substantially continuous movement between the rows and which delivers the material to the center of the path between the rows for subsequent removal or disking into the soil.

A further object is to provide such an apparatus which is fully adjustable and adapted for the removal of material from virtually all row crops and which is adapted to be mounted on and borne by virtually any vehicle for such operation.

A still further object is to provide such an apparatus which requires no auxiliary power source for operation other than the vehicle on which it is mounted and which is driven by contact with the earth's surface during movement thereover.

Further objects and advantages are to provide improved elements and arrangements thereof in an apparatus for the purposes described which is dependable, economical, durable and fully effective in accomplishing its intended purposes.

These and other objects and advantages are achieved in the apparatus for removing material from a work area of the present invention, in the preferred embodiment, using a frame adapted to be mounted on a vehicle for substantially continuous movement along the work area; mounting a wheel assembly mounted for rotational movement about a substantially upright axis of rotation, the wheel assembly having a plurality of projections disposed for earth engagement outwardly of and substantially concentric to the axis of rotation and a plurality of semi flexible removing members extending outwardly from and about the wheel assembly and individually mounting blades on the distal end portions thereof; and an adjusting mechanism operable to place the wheel assembly in an oblique attitude relative to the earth's surface with a portion of the projections laterally disposed with respect to direction of movement of the vehicle along the work area in ground engagement whereby movement of the vehicle causes the wheel assembly to rotate about the axis of rotation to carry the removing members through the work area to remove material therefrom.

DESCRIPTION OF THE PREFERRED EMBODIMENT

Figure 1:
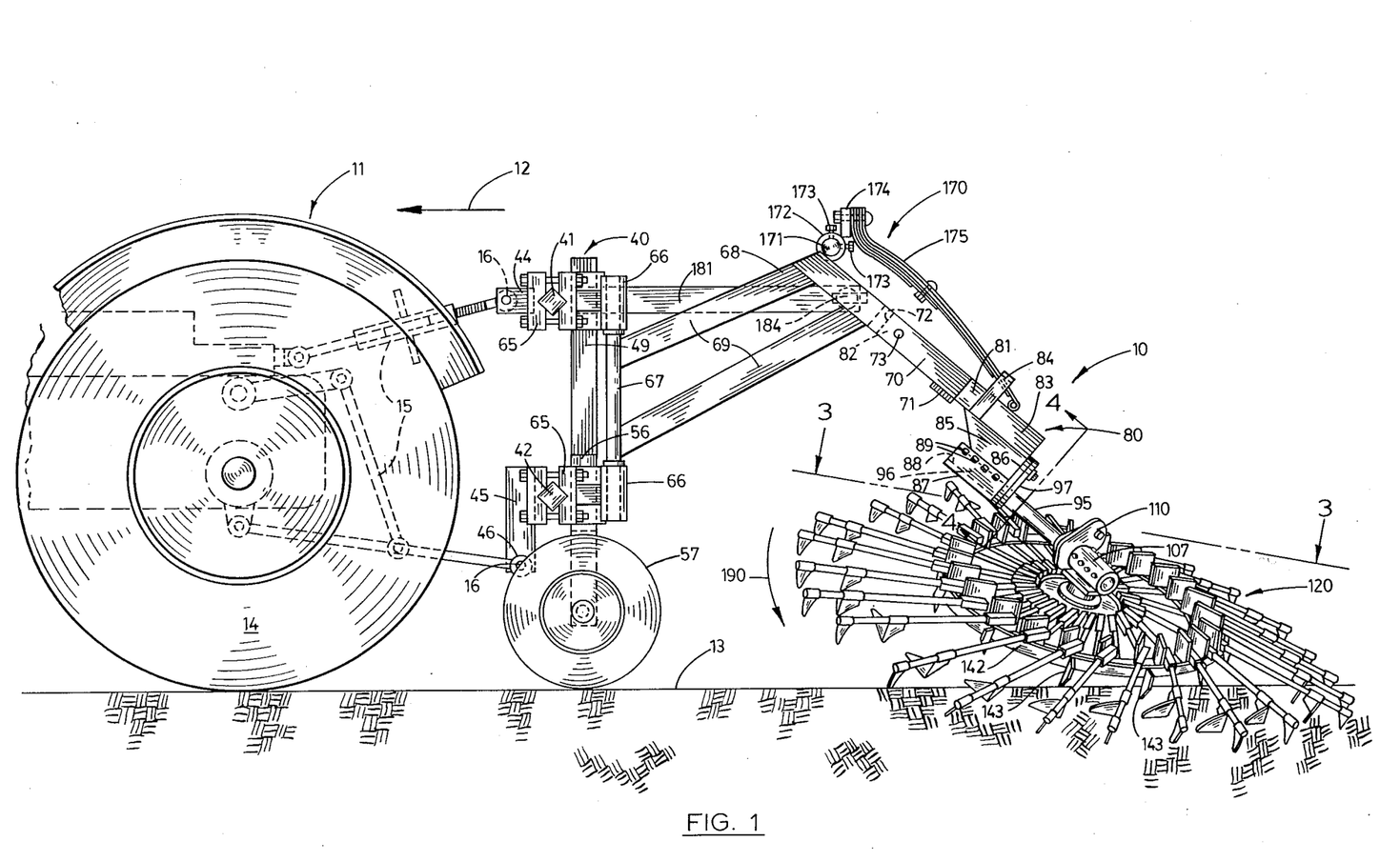
FIG. 1 is a side elevation of the apparatus for removing material from a work area of the present invention shown in a typical operative environment mounted on a tractor.

Referring more particularly to the drawings, the apparatus for removing material from a work area of the present invention is generally indicated by the numeral 10 in FIG. 1. As shown therein, the apparatus is mounted on a conventional tractor 11 operable for earth traversing movement in the direction indicated by arrow 12 over the earth's surface 13. The tractor is shown only fragmentarily in the drawings for illustrative convenience and, as shown, has rear wheels 14 and a conventional, hydraulically operated three point hitch assembly 15 having connection points 16. The connection points are adapted to mount, in the conventional fashion, a variety of agricultural implements.

Figure 7:
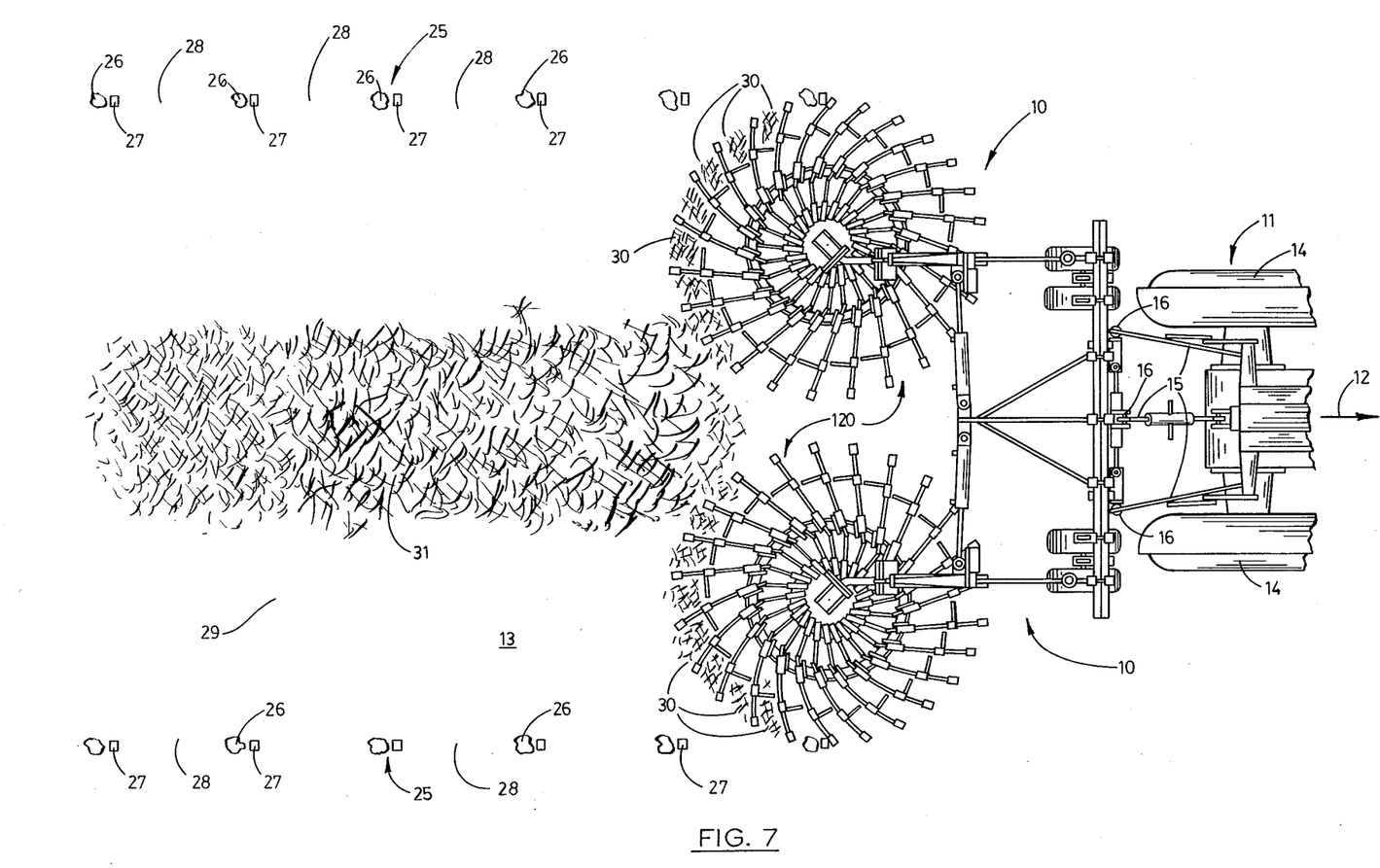
FIG. 7 is a top plan view of the apparatus in a typical operative environment showing it in operation mounted on a tractor in continuous movement along a path of travel between adjoining rows of grapevines removing material adjacent to and between adjoining grapevines within the rows.

Also for illustrative convenience, the apparatus 10 is shown in FIG. 7 mounted on the tractor 11 during operation in a typical operational environment. As shown therein, a pair of adjoining rows of grapevines 25 are each composed of a plurality of grapevines 26 supported on and braced by trellis structures 27 in the conventional fashion. For illustrative convenience, the grapevines and trellis structures are shown sectioned horizontally just above ground level. Adjoining grapevines within each row are separated from each other by a space 28. The adjoining rows of grapevines 25 are separated from each other by a path 29. Material, such as weeds, prunings, leaves and other trash, to be removed is indicated at 30. As will hereinafter be described, the apparatus is operated to remove the material adjacent to and along the rows of grapevines, to deliver it to the path 29 between the rows of grapevines and deposit the material in windrow 31 approximately in the center of the path.

It will be understood that in the illustrative example of FIG. 7, each row of grapevines 25 constitutes a work area. The apparatus 10 of the present invention is adapted to remove a variety of types of material from a variety of work areas. For example, the apparatus can be adjusted to operate to remove trash from adjacent to and along rows of fruit and nut trees as well as from between adjoining trees in the row. Similarly, the apparatus can be operated to remove weeds growing in the sate areas and to deliver them to the path 29, as will hereinafter become more clearly apparent.

Figure 2:
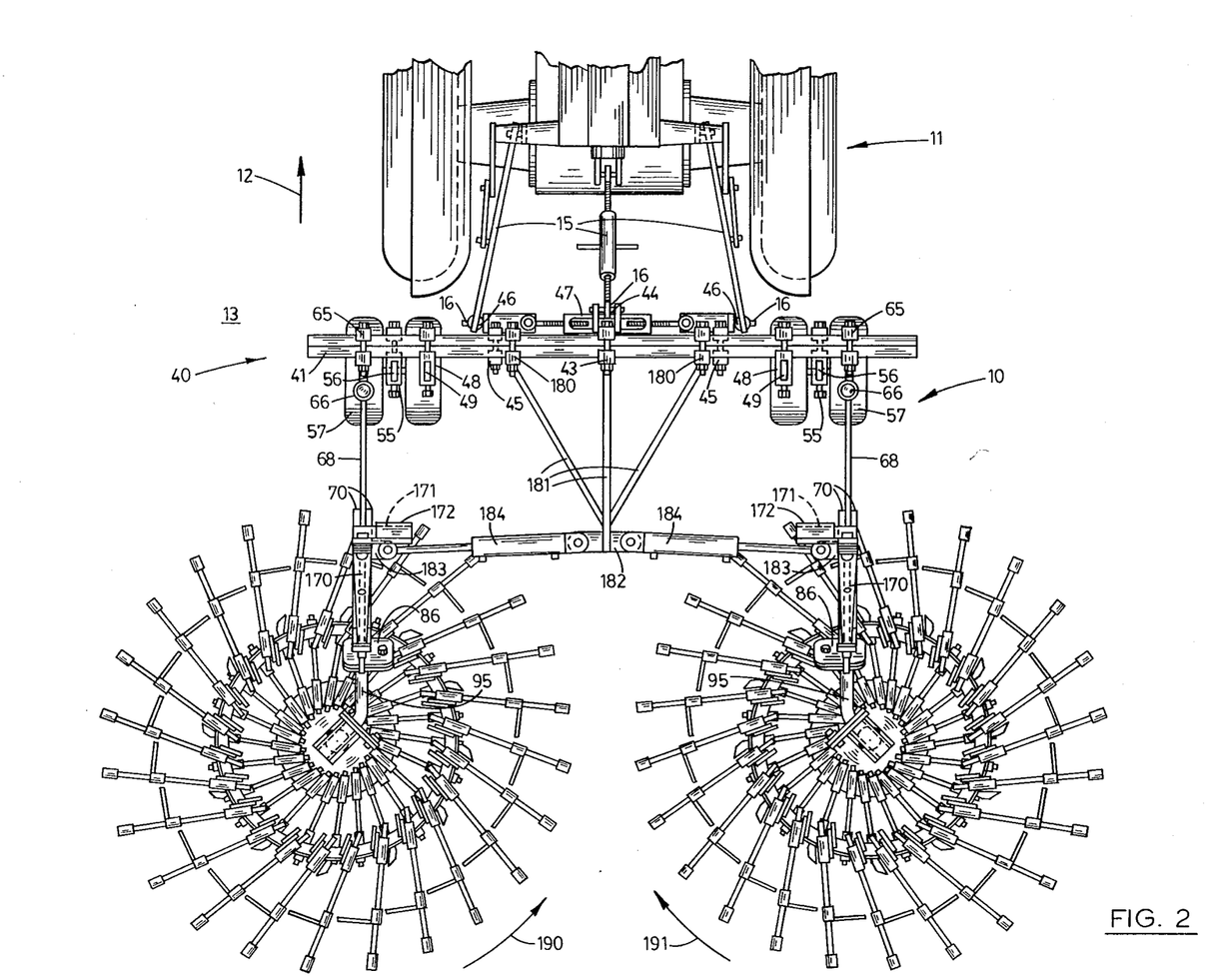
FIG. 2 is a top plan view of the apparatus of FIG. 1.

In the preferred embodiment the apparatus 10 has a main frame generally indicated at 40. The main frame has upper and lower tool bars 41 and 42 respectively which extend transversely of the direction of travel indicated by arrow 12 in vertically spaced, substantially parallel relation. A central clamp assembly 43 is mounted on the upper tool bar centrally thereof and has a pivotal connection 44 which is pivotally connected to the upper connection point 16 of the three point hitch assembly 15 of the tractor 11. A pair of lower clamp assemblies 45 are mounted on the lower tool bar in spaced relation to each other and individually have pivotal connections 46 which are individually pivotally connected to the lower connection points 16 of the three point hitch assembly 15. The lower clamp assemblies 45 are interconnected by a turn buckle assembly 47. Clamp assemblies 48 are mounted in corresponding pairs on the upper and lower tool bars and are interconnected by vertical linking bars 49 to form a rigid frame adapted to be lifted in rectilinear fashion on the connection points 16 by the three point hitch assembly 15.

The main frame 40 has a pair of wheel clamp assemblies 55 individually mounted on the lower tool bar 42 just outwardly of the respective clamp assemblies 48. A wheel bar 56, having a dual wheel assembly 57, is mounted on each of the wheel clamp assemblies extending downwardly therefrom and with the wheel assemblies disposed for supporting the main frame for movement in trailing relation to the tractor 11 on which the apparatus is mounted.

Four sub-frame clamp assemblies 65 are individually mounted on the upper and lower tool bars 41 and 42 respectively with corresponding sub-frame clamp assemblies on the upper and lower tool bars disposed in vertical alignment. Each sub-frame clamp assembly mounts a bearing assembly 66 in trailing relation to its respective tool bar. A pivot shaft 67 is mounted in the corresponding vertically aligned bearing assemblies for pivotal movement about vertical axes, as can best be seen in FIG. 1.

A sub-frame 68 is mounted on each pivot shaft 67 extending rearwardly therefrom for pivotal movement with the pivot shaft. Each sub-frame has a pair of beams 69, best seen in FIG. 1, having a pair of side plates mounted, as by welding, on corresponding opposite faces of the remote end portions of the beams and extending generally downwardly and rearwardly therefrom. A stop plate is mounted on and interconnects the undersides of the remote ends of the side plates and the side plates are retained in spaced, substantially parallel relation to define a slot 72 therebetween. A pivot pin is mounted on and interconnects the side plates substantially midway between the opposite ends thereof.

An arm assembly 80 is mounted on each sub-frame 68, as can best be seen in FIG. 1. Each arm assemble has a pivot beam 81 with a proximal portion 82 received in the slot 72 and pivotally mounted on the pivot pin 73. The pivot beam is gravitationally rested on the stop plate 71 and has a distal portion extending from the slot. A box like spring frame 84 is mounted on the distal portion of the pivot beam extending upwardly therefrom. A lower flange 85 is mounted by welding on the underside of the distal portion of the pivot beam extending downwardly therefrom. A back plate 86 is affixed on the edge of the lower flange extending transversely with respect to the pivot beam. A cylindrical mounting sleeve 87 is welded on the lower end of the lower flange and on the back of the back plate. The mounting sleeve has a cylindrical internal passage 88 which extends through the back plate to communicate with the face thereof. A plurality of lock bolts 89 are screw-threadably secured in the mounting sleeve and are screw-threadably adjustable into and from the internal passage of the sleeve.

Figures 4, 5, 6:
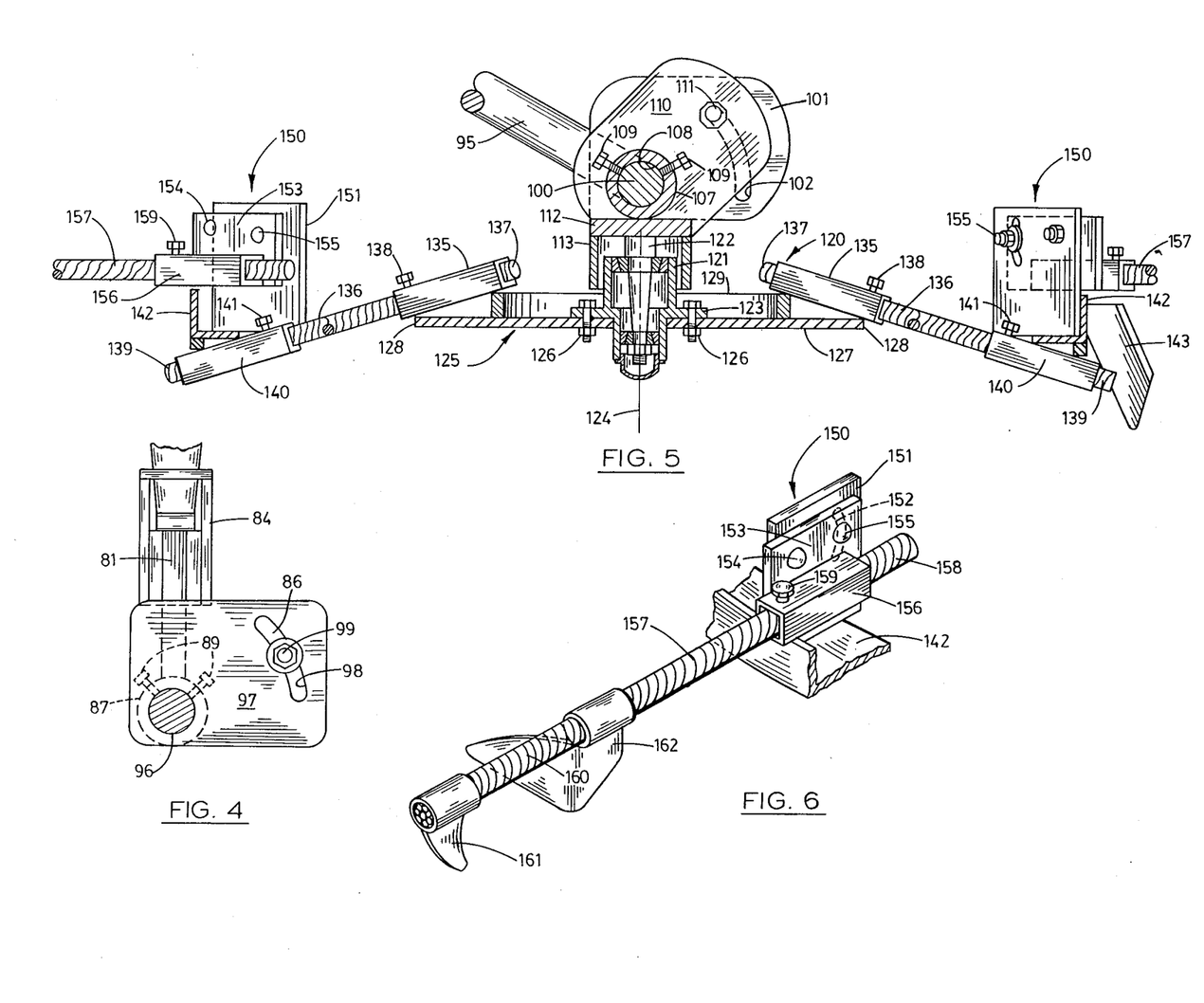
FIG. 4 is a somewhat enlarged, fragmentary transverse section taken on line 4—4 in FIG. 1.
FIG. 5 is a somewhat enlarged, fragmentary transverse section taken on line 5—5 in FIG. 3.
FIG. 6 is a somewhat enlarged, fragmentary transverse section taken on line 6—6 in FIG. 3.

Each arm assembly 80 has an adjustment arm 95 with a proximal portion 96 received within the mounting sleeve 87 of the arm assembly 80 and locked in place by the lock bolts 89. An adjustment plate 97 is mounted, as by welding, on the adjustment arm in facing engagement with the back plate 86, as best seen in FIG. 4. The adjustment plate has an arcuate slot 98 therein and a bolt and nut assembly 99 is mounted on and interconnects the back plate and the adjustment plate extending through the slot. By loosening the bolt and nut assembly and the lock bolts 89, the arm 95 can be pivoted about its longitudinal axis for repositioning and locked in the new position by again tightening the nut and bolt assembly and lock bolts.

Figure 3:
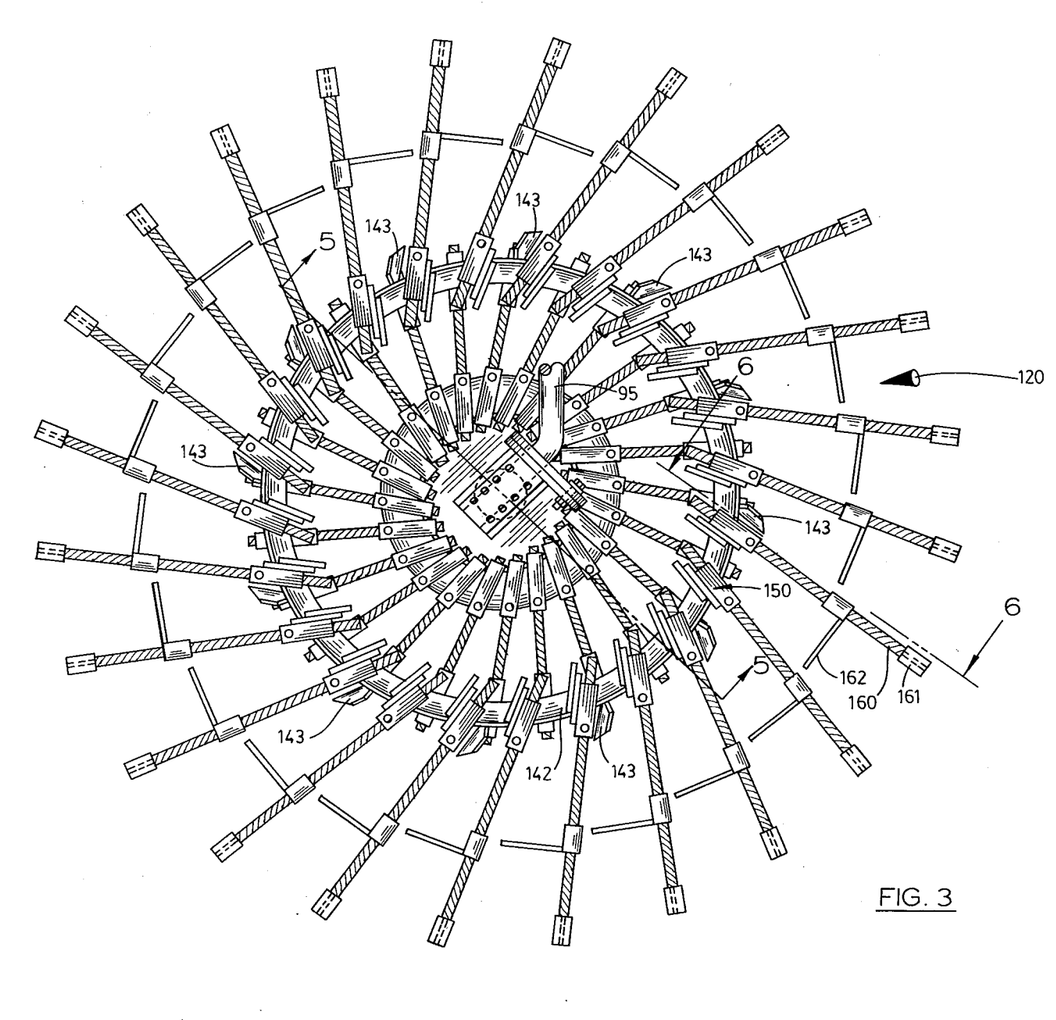
FIG. 3 is a somewhat enlarged, fragmentary top plan view taken from a position indicated by line 3—3 in FIG. 1 and showing the wheel assembly thereof.

The arm 95 has an angled distal portion 100 best shown in FIGS. 2, 3 and 5. An adjustment plate 101 is mounted, as by welding, on the distal portion just outwardly of the bend forming the angle. The adjustment plate is normal to the longitudinal axis of the angled distal portion. An arcuate slot 102 is provided in and extends through the adjustment plate, as best shown in FIG. 5.

A mounting sleeve 107, having an internal passage 108, is mounted on the distal portion 100 of the arm 95 by a plurality of lock bolts 109 screw-threadably extended radially therethrough and into engagement with the distal portion therewithin, as best shown in FIG. 5. A back plate 110 is welded on the mounting sleeve normal to and extending about the distal portion of the arm. Thus, the distal portion extends through a hole in the back plate and into the internal passage of the mounting sleeve. A bolt and nut assembly 111 are mounted on the back plate and interconnect the back plate and the adjustable plate 101 extending through the arcuate slot 102 as shown in FIG. 5. A rectangular base plate 112 is welded on the underside of the mounting sleeve 107 and has a cylindrical bearing housing 113 welded beneath the base plate.

Each of the arm assemblies 80 mounts a wheel assembly 120 best shown in FIGS. 1, 2, 3 and 5. With particular reference to FIG. 5, each wheel assembly is mounted on the distal portion 100 of its respective arm 95 in depending relation by a bearing assembly 121 having a spindle which is mounted by welding on the base plate 112. The bearing assembly has an annular flange 123 and is adapted to permit rotation of the wheel assembly about an axis of rotation 124 shown in FIG. 5.

A hub assembly 125 is mounted on the annular flange 123 of the bearing assembly 121 by a plurality of bolt and nut assemblies 126. The hub assembly has a hub plate 127, secured on the annular flange 123 as shown in FIG. 5 by the bolt and nut assemblies 126, having a circular peripheral edge 128 and an annular hub ring 129 welded on the upper side thereof inwardly of the peripheral edge 128 a predetermined distance beet shown in FIG. 5.

A plurality of rod mounts 135, in this case square tubes, are welded on the hub assembly 125 in the pattern shown best in FIG. 3. Each rod mount is welded on the hub ring 129 and peripheral edge 128 to extend outwardly and downwardly from the hub assembly as shown in FIG. 5. Each rod mount, as best shown in FIG. 3, is preferably disposed at an angle with respect to a radius of reference passing through the axis of rotation 124. The angle is such that the rod mount diverges therefrom in trailing relation to the radius of reference with respect to the direction of rotation of the wheel assembly, as will hereinafter become more clearly apparent.

A semi flexible cable or rod 136, having a proximal portion 137, is received with its proximal portion in the rod mount 135 and is locked in position by a lock bolt 138 extending screw-threadably through a suitable hole in the rod mount and impinging upon the proximal portion of the rod therewithin. Each rod has a distal portion 139 on which is mounted a ring mount 140 by a lock bolt 141 extending screw-threadably through a suitable hole in the ring mount and impinging upon the distal portion 139. A mounting ring 142 is welded on the upper surfaces of the ring mounts 140, as best shown in FIG. 3, concentric to the axis of rotation 124 of the bearing assembly 121. A plurality of drive teeth 143 are mounted on the mounting ring 142 distributed in evenly spaced relation about the mounting ring and extending downwardly therefrom.

As can best be seen in FIGS. 3, 5 and 6, a multiplicity of member mounting assemblies 150 are mounted on the mounting ring 142 distributed in evenly spaced relation about the mounting ring. Each mounting assembly is canted, relative to an individual radii of reference passing through the axis of rotation 124, rearwardly relative to the normal direction of rotation of the wheel assembly 120, which is counterclockwise as viewed in FIG. 3. Referring more particularly to FIGS. 5 and 6, each member mounting assembly 150 has a lock plate 151 welded in upstanding relation on the mounting ring in the above-identified canted attitude. The back plate has an arcuate slot 152. An adjustment plate 153 is mounted on the back plate for pivotal movement about a pivot pin 154. A bolt and nut assembly 155 interconnects the adjustment plate and the back plate extending through the slot so as to permit the adjustment plate to be pivoted as permitted by the slot.

A mounting sleeve 156 in the form of a square tube is welded on the adjustment plate 153 of each mounting assembly 150, as best shown in FIGS. 5 and 6, for movement therewith. A semi flexible removing member 157, having a proximal portion 158, is received in the mounting sleeve by its proximal portion and is locked in position by a lock bolt 159 screw-threadably extended through a suitable hole in the mounting sleeve and impinging upon the removing member. In the preferred embodiment, the removing member is a section of steel cable. However, a variety of semi flexible or other materials can be employed without departing from the scope of the invention.

Each removing member 157 has a distal portion 160, in the preferred embodiment, mounting a raking blade 161 on the outermost end thereof and a weeding blade 162 inwardly therefrom. This combination of blades has been found uniquely well suited to removing material of the type described while digging out weeds at the same time. However, a variety of different types of blades can be employed, or, alternatively, the apparatus can also be operated with no blades on the removing members. Still another variant for use particularly where there are unusually delicate plants or structures to be protected is to mount a rubber or plastic tube about the removing member to minimize damage to the foregoing.

Each arm assembly 80 mounts a spring assembly 170 operable to impart lifting force to the pivot beam 81 as a counterbalance to gravity. The wheel assemblies 120 are thereby provided with a floating action. Each spring assembly 170 has a shaft 171 mounted on the upper ends of the side plates 70 normal thereto and extending inwardly as shown in FIG. 2. A sleeve 172 is received about the shaft and retained in position by lock bolts 173 screw-threadably extending through suitable holes in the sleeve and impinging upon the shaft. A flange 174 is welded on the sleeve and mounts a support spring 175 thereon which is attached at its opposite end to the distal portion 83 of its respective pivot beam 81. The support spring extends through the spring frame 84. The support spring thus imparts lifting force to pivot beam to counterbalance gravity to the extent desired.

As best shown in FIG. 2, a pair of clamp assemblies 180 are mounted on the upper tool bar 41. A support frame 181 is mounted on the central clamp assembly 43 and the clamp assemblies 180 extending rearwardly from the upper tool bar relative to the direction to travel indicated by arrow 12. A connection plate 182 is welded on the rearwardmost portion to the support frame. Connection flanges 183 are welded on the innermost of each pair of side plates 70 in alignment with the connection plate 182. A pair of hydraulic cylinders operably interconnect the connection plate and the connection flanges. The hydraulic cylinders are operable through a suitable hydraulic system, not shown, to expand or contract to position the wheel assemblies 120 relative to each other.

As hereinafter described in greater detail, the wheel assembly 120 on the left in FIG. 2 is rotated by ground engagement in a counterclockwise direction as viewed therein and as indicated by arrow 190. The wheel assembly 120 on the right in FIG. 2 is rotated by ground engagement in a clockwise direction as viewed therein and as indicated by arrow 191.

OPERATION

The operation of the described embodiment of the present invention is believed to be readily apparent and is briefly summarized at this point. The apparatus 10 is mounted on the tractor 11 as heretofore described and as shown in FIGS. 1, 2 and 7. The apparatus is adjusted to suit the work to be performed. In the illustrative example of FIG. 7, the apparatus is employed to remove material such as prunings, leaves, trash and weeds from two adjoining rows of grapevines 25 separated by a path 29. The wheel assemblies 120 are thus spaced from each other, using the hydraulic cylinders 184, as shown in FIG. 7. It is preferred that such spacing result in the distal portions 160 of the removing members 157 extending approximately half way into the spaces 28 between adjoining grapevines in the rows on each side.

The individual attitudes of the wheel assemblies 120 are adjusted so that they are disposed in oblique attitudes relative to the earth's surface 13 with the several drive teeth 143 on the mounting ring 142 nearest the adjacent rows of grapevines 25 in ground engagement. This is best seen in FIG. 1. Such adjustment of the wheel assemblies is achieved by loosening the bolt and nut assembly 99 to reposition the adjustment plate 97, and thus the adjustment arm 95. The lock bolts 89 are, however, first loosened so as to permit movement of the proximal portion 96 of the adjustment art 95 within the mounting sleeve 87. The lock bolts 89 and the bolt and nut assembly 99 are again tightened when the desired attitude for that wheel assembly has been achieved.

Similarly, it may be desired to impart a slight forward or rearward cant to each wheel assembly 120 and this can be achieved by loosening the lock bolts 109 and bolt and nut assembly 111. The wheel assembly is then tilted to the desired attitude as permitted by the bolt and nut assembly 111 within the slot 102. The lock bolts 109 and bolt and nut assembly 111 are then retightened.

The removing members 157 can also be adjusted for most effective operation based upon the conditions existing in the work areas. The normal attitude of adjustment is shown in the drawings. Such adjustment is appropriate when the earth's surface is substantially flat in the work area, or, in the illustrative embodiment, along the rows of grapevines 25. However, in some instances, for example, the earth's surface may have a berm within the work area such as in which the grapevines are planted. In these instances while the removing members flex to accommodate such elevational deviation, it may be desired to raise the removing members from the attitudes shown in the drawings. This is particularly true where the berm is high or presents a steep slope. Such adjustment is accomplished by loosening the bolt and nut assemblies 155 of the member mounting assemblies and pivoting the removing members upwardly to the desired degree. The bolt and nut assemblies are then retightened to secure the removing members in the new attitudes. If desired, the removing members can be adjusted downwardly as well.

When adjusted as desired, the tractor 10 is simply driven down the center of the path 29 between the rows of grapevines 25 as shown in FIG. 7. The drive teeth 143 of the respective wheel assemblies 120 engaging the earth's surface tend to remit it position. As the tractor moves away from them, the wheel assemblies are caused to rotate in the directions indicated by the arrows 190 and 191 in FIG. 2. As the wheel assemblies rotate, successive drive teeth are brought into ground engagement which continues such rotation of the wheel assemblies. Depending upon the attitudes of adjustment of the removing members 157, the engagement of the raking blades 161 and weeding blades 162 with the earth's surface also contributes to rotation of the wheel assemblies. In fact, the wheel assemblies and removing members can be so adjusted, if desired, that the removing members contact the earth's surface but the drive teeth do not and the wheel assemblies will nonetheless be rotated by such ground engagement of the removing members.

Accordingly, the resulting effect is that the removing members 157 are caused successively to be moved through the work areas along the rows of grapevines 25 and through the spaces 28 between adjoining grapevines 26 in the rows. Prunings, leaves and trash are thus raked from the work areas and into a windrow 31 in the path 29. Weeds growing in the work areas are dug out or cut down by the weeding blades 162 of the removing members. Conversely, the flexible nature of the removing members causes them to flex to avoid damage to the grapevines 26 and trellis structures 27. Similarly, the removing members do not damage irrigation or other equipment in the work areas. The removing members have been found remarkably sensitive in avoiding damage to such objects.

As previously noted, the apparatus 10 can be constructed in a wide variety of embodiments. The apparatus, for example, can be constructed so as to permit it to be mounted on the front of the tractor or can be constructed as an entirely self contained vehicle providing its own means of propulsion. Additionally, the upper and lower tool bars 41 and 42 of the main frame 40 are available for mounting any combination of the earth working tools or other implements. The preferred embodiment of the invention is uniquely well suited to operation for the reasons noted.

Therefore, the apparatus for removing material from a work area of the present invention is particularly well suited to the removal of weeds, prunings, trash and the like from adjacent to row crops such as grapevines, fruit and nut trees and the like; is fully capable of removing all such trash, both immediately adjacent to the row and between adjoining plants within the row; is sufficiently sensitive in operation to avoid damage to the plants within the row as well as irrigation systems, trellis structures and the like, and can be operated economically by both large and small scale farming operators.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An apparatus for removing material from a work area on the earth's surface during substantially continuous movement therealong, the apparatus comprising:
   A. a frame adapted to be mounted on a tractor or the like for substantially continuous movement along the work area along a path of travel substantially parallel thereto;
   B. an arm mounted on the frame having a distal end portion disposed for movement in relative proximity to the work area during said substantially continuous movement therealong;
   C. a wheel assembly mounted on the distal end portion of the arm for rotational movement about a substantially upright axis of rotation and having a plurality of ground engaging projections mounted on the wheel assembly outwardly spaced from and substantially concentric to said axis of rotation;
   D. a plurality of material removing members mounted on the wheel assembly extending outwardly therefrom for engagement with material in said work area during said substantially continuous movement therealong; and
   E. means for adjusting the attitude of said wheel assembly relative to said earth's surface to place a portion of said projections into engagement with the earth's surface whereby said wheel assembly is driven in rotational movement about the axis of rotation by said engagement of the projections with the earth's surface during said substantially continuous movement along the work area to pass the removing members through the work area to remove material therefrom.

2. The apparatus of claim 1 wherein the wheel assembly has a substantially circular periphery in proximity to which said projections are mounted and said adjusting means is operable to dispose the wheel assembly in an oblique attitude such that a portion of said projections engage the earth's surface whereby said substantially continuous movement of the vehicle causes the projections to rotate the wheel assembly by said engagement with the earth's surface carrying successive projections into said engagement and continuing said rotation of the wheel assembly during the substantially continuous movement of the vehicle.

3. The apparatus of claim 2 wherein said removing member extend outwardly from the periphery of the wheel assembly and are sufficiently flexible to be deformed by contact with the earth's surface and by contact with objects to be protected within the work area to pass therethrough removing said material therefrom without damage to said objects to be protected.

4. The apparatus of claim 2 wherein said removing members are mounted adjacent to said periphery of the wheel assembly for adjustment of their respective attitudes relative to the wheel assembly for enhanced removal of material from said work area.

5. The apparatus of claim 1 wherein blades are mounted on the remote end portions of the removing members for removing weeds and the like from the work area.

6. The apparatus of claim 1 wherein the wheel assembly has a hub member for said rotational movement on the distal end portion of the arm, a plurality of rods extending outwardly from and about the hub member, a circular ring member mounted on remote ends of the rods substantially concentric to said axis of rotation and mounting said ground engaging projections thereon and the material removing members are mounted on and extend outwardly from the ring member.

7. The apparatus of claim 6 wherein said rods and removing members are sufficiently flexible that the adjusting means is operable to position the ring member and removing members in said engagement with the earth's surface with the rods and removing members deformed so that said wheel assembly conforms to the earth's surface during said rotational movement.

8. The apparatus of claim 6 wherein said removing members are mounted on the ring member of the wheel assembly in attitudes individually divergent from radii of reference from said axis of rotation.

9. The apparatus of claim 8 wherein said individually divergent attitudes of the removing members are rearwardly divergent from said radii of reference relative to the direction of rotation of the wheel assembly about said axis of rotation.

10. The apparatus of claim 1 wherein said arm is mounted on the frame for substantially pivotal movement about an axis substantially parallel to the earth's surface and substantially normal to the direction of said substantially continuous movement of the apparatus along the work area whereby said wheel assembly is substantially gravitationally retained with said projections in engagement with the earth's surface.

11. The apparatus of claim 10 including a spring member interconnecting the frame and the arm for imparting lifting force to the arm relative to the frame to provide a substantially floating action to the wheel assembly relative to the earth's surface.

12. The apparatus of claim 1 wherein a pair of said arms, wheel assemblies and adjusting means are borne by said frame for removing said material from a pair of spaced substantially parallel work areas during a single pass in said substantially continuous movement between said work areas.

13. The apparatus of claim 12 wherein said arms are mounted on the frame for individual substantially pivotal movement about substantially vertical axes and means interconnect said arms for individually pivoting the arms about said axes to adjust the distance between said wheel assemblies for improved material removal from said work areas.

14. The apparatus of claim 12 wherein said adjusting means are operable to dispose the wheel assemblies in complementary oblique attitudes such that the corresponding projections of the respective wheel assemblies placed in engagement with the earth's surface are those farthest from each other whereby the respective wheel assemblies are rotated in opposite directions during said substantially continuous movement between the work areas to remove said material from their respective work areas and deposit the material in a windrow between the work areas.

* * * * *

UNITED STATES PATENT AND TRADEMARK OFFICE
CERTIFICATE OF CORRECTION

PATENT NO. : 4,782,654

DATED : November 8, 1988

INVENTOR(S) : Paul A. Bezzerides

It is certified that error appears in the above-identified patent and that said Letters Patent is hereby corrected as shown below:

Column 4, line 13, delete "sate" and substitute ---same---.

Column 5, line 2, delete "assemble" and substitute ---assembly---.

Column 6, line 8, delete "beet" and substitute ---best---.

Column 8, line 49, delete "remit it" and substitute ---remain in---.

Column 10, line 19, delete "member" and substitute ---members---.

Signed and Sealed this

Fourteenth Day of March, 1989

Attest:

DONALD J. QUIGG

*Attesting Officer*    *Commissioner of Patents and Trademarks*